United States Patent
Su et al.

(10) Patent No.: US 9,274,261 B2
(45) Date of Patent: Mar. 1, 2016

(54) LIGHT EMITTING DEVICE, FLAT LIGHT AND FLAT PANEL DISPLAY

(71) Applicant: Lextar Electronics Corporation, Hsinchu (TW)

(72) Inventors: Chen-Yi Su, Taoyuan (TW); Yung-Long Jian, New Taipei (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/324,387

(22) Filed: Jul. 7, 2014

(65) Prior Publication Data

US 2015/0042924 A1 Feb. 12, 2015

(30) Foreign Application Priority Data

Aug. 9, 2013 (TW) .............................. 102128715 A

(51) Int. Cl.
*F21V 8/00* (2006.01)
*G02F 1/1335* (2006.01)

(52) U.S. Cl.
CPC ............ *G02B 6/0011* (2013.01); *G02B 6/0091* (2013.01); *G02F 1/133615* (2013.01); *G02F 2201/46* (2013.01)

(58) Field of Classification Search
CPC combination set(s) only.
See application file for complete search history.

(56) References Cited

U.S. PATENT DOCUMENTS

| 7,649,590 B2 * | 1/2010 | Park et al. ...................... 349/65 |
| 7,784,989 B2 | 8/2010 | Shin |
| 2008/0049444 A1 * | 2/2008 | Hsiao et al. ................... 362/611 |
| 2008/0111949 A1 * | 5/2008 | Shibata et al. ................... 349/64 |
| 2008/0225203 A1 * | 9/2008 | Kim ................................. 349/65 |
| 2011/0267841 A1 | 11/2011 | Lee et al. |
| 2012/0162566 A1 * | 6/2012 | Shimomichi ................... 349/58 |

FOREIGN PATENT DOCUMENTS

| CN | 101025511 A | 8/2007 |
| EP | 2597499 A2 | 5/2013 |
| TW | M255414 | 1/2005 |
| TW | 200900635 A | 1/2009 |
| TW | M443133 | 12/2012 |

OTHER PUBLICATIONS

English Abstract translation of TWM443133 (Published Dec. 11, 2012).
EP Search Report dated Jan. 28, 2015 in corresponding European Application (No. 14176004.1-1562/2835673).
TW Office Action dated Apr. 29, 2015 in corresponding Taiwan application (No. 102128715).

\* cited by examiner

*Primary Examiner* — Wen-Ying P Chen
(74) *Attorney, Agent, or Firm* — McClure, Qualey & Rodack, LLP

(57) ABSTRACT

A light emitting device comprising a first frame, a light bar and a light guide plate is provided. The first frame has a groove which has a bottom plane, two inner walls, and an opening. The light bar disposed in the groove comprises a substrate having a lower surface attached to the bottom plane and an upper surface having several light sources. The light guide plate has a light emitting surface and a light incident surface. The light incident surface perpendicular and adjoining to the light emitting surface has several abutting portions. The light guide plate is inserted to the groove via the opening. The emitting light of the light source entering the light guide plate is guided by the light guide plate to be emitted off the light emitting surface. The abutting portions abut to the upper surface, so that the light bar is fixed in the groove.

10 Claims, 3 Drawing Sheets

LIGHT EMITTING DEVICE, FLAT LIGHT AND FLAT PANEL DISPLAY

This application claims the benefit of Taiwan application Serial No. 102128715, filed Aug. 9, 2013, the subject matter of which is incorporated herein by reference.

BACKGROUND OF THE INVENTION

1. Field of the Invention

The invention relates in general to a light emitting device, and more particularly to an edge-lit light emitting device.

2. Description of the Related Art

The edge-lit light emitting module converts a weaker light source from lateral side into a plane light source through the use of a light guide plate, and requires a fixing device for fixing the light source on side of the light guide plate by way of screw locking or adhesive bonding. When screw locking is used, firstly, components must be aligned, and the light source may be damaged if the alignment is biased or the screws are not driven properly. When adhesive bonding is used, pollution is generated and bonding time is required.

SUMMARY OF THE INVENTION

The invention is directed to a light emitting device which fixes a light bar (a light source) between a light incident surface of a light guide plate and a frame through the structure of the light guide plate.

According to one embodiment of the present invention, a light emitting device is provided. The light emitting device comprises a first frame, a light bar and a light guide plate. An inner side of the first frame has an strip groove. The groove has a bottom plane, two inner walls perpendicular to two sides of the bottom plane, and an opening. The light bar is disposed in the groove, and comprises a substrate. The substrate has a lower surface and an upper surface opposite to the lower surface. The lower surface is attached to the bottom plane of the groove. The upper surface has several light sources. The light guide plate has a light emitting surface and a light incident surface. The light incident surface is positioned on one side of the light guide plate and perpendicular and adjoining to the light emitting surface. The light guide plate has several protruded abutting portions. The side of the light guide plate having the light incident surface is inserted to the groove via the opening. The emitting light of the light source can enter the light guide plate via the light incident surface first and then is further guided by the light guide plate to be emitted off the light emitting surface. the abutting portions of the light guide plate abut to the upper surface of the substrate or the light sources, so that the light bar is fixed in the groove and does not slide.

According to another embodiment of the present invention, a flat light is provided. The flat light comprises the said light emitting device and a lamp shade. The lamp shade is disposed on the light emitting device and faces towards a light emitting surface of the light emitting device.

According to an alternate embodiment of the present invention, a flat panel display is provided. The flat panel display comprises the said light emitting device and a liquid crystal panel. The liquid crystal panel is disposed on the light emitting device and faces towards a light emitting surface of the light emitting device.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
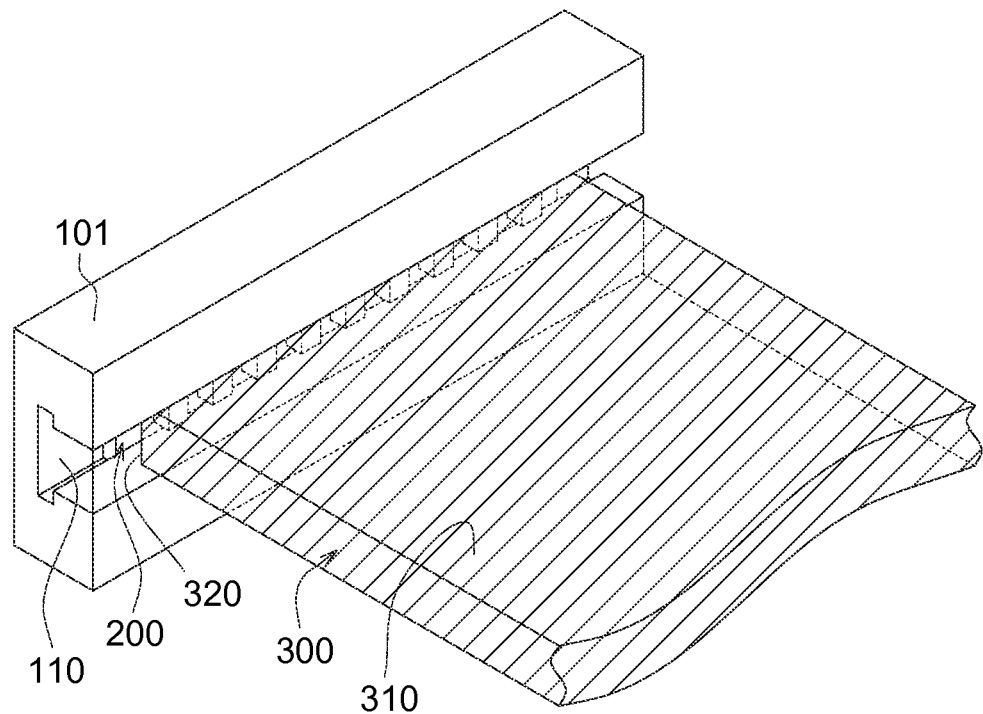
FIG. 1 is a schematic diagram of a portion of a light emitting device according to an embodiment of the invention.

Referring to FIG. 1, a schematic diagram of a portion of a light emitting device according to an embodiment of the invention is shown. The light emitting device 10 is an edge-lit light emitting device (whose light sources are located on a lateral side), such as a flat light or a backlight module of a display, and comprises a first frame 101, a light bar 200 and a light guide plate 300.

Figure 2A:
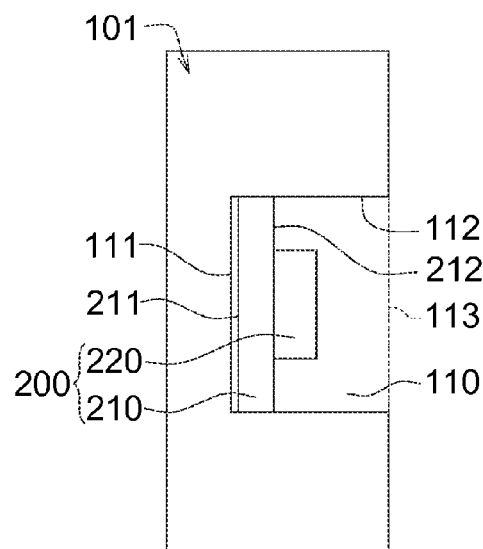
FIG. 2A is a side view of a first frame and a light bar of a light emitting device according to an embodiment of the invention

Referring to FIG. 2A, a side view of a first frame 101 and a light bar 200 of a light emitting device according to an embodiment of the invention is shown. An inner side of the first frame 101 has an strip groove 110. The groove 110 has a width larger than or equal to that of the light bar 200 and the light guide plate 300 for receiving the light bar 200 and one side of the light guide plate 300. The groove 110 has a bottom plane 111, two inner walls 112 and an opening 113, wherein the bottom plane 111 is opposite to the opening 113, and the two inner walls 112 are perpendicular to two sides of the bottom plane 111 respectively.

As indicated in FIG. 2A, the light bar 200 is disposed in the groove 110, and comprises a substrate 210 and a light source 220. The substrate 210 has a lower surface 211 and an upper surface 212 opposite to the lower surface 211, wherein the lower surface 211 corresponds to the bottom plane 111 of the groove 110, and the upper surface corresponds to the opening 113 of the groove 110. To make FIG. 2 more clearly illustrated, the lower surface 211 of the substrate 210 and the bottom plane 111 of the groove 110 are separated by a space which can be interposed with a material whose thermal conductivity is high (such as a thermal conductive adhesive) to help dissipating the heat generated by the light bar. In other embodiments, the lower surface 211 and the bottom plane 111 can be close to each other, and the invention is not limited thereto. The light sources 220 (such as light emitting diodes, LEDs) are disposed on the upper surface 212 of the substrate 210 and face towards the opening 113 for emitting a light.

Figure 2B:
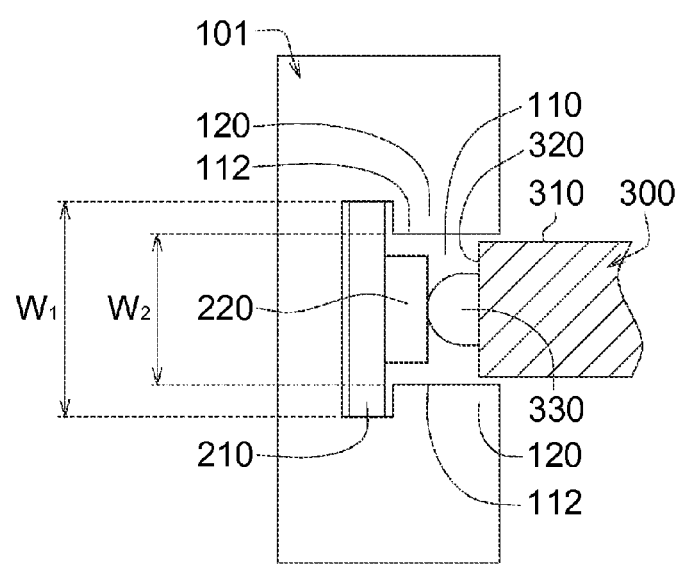
FIG. 2B is a side view of the light emitting device of FIG. 1.

FIG. 2B is a side view of the light emitting device of FIG. 1. A limiting portion 120 can be disposed in the first frame 101 so that the first frame 101 and the light bar 200 can be fixed more firmly. The limiting portion 120 is protruded towards interior of the groove 110 from two inner walls 112 of the groove 110 respectively so that the groove 110 is divided into two portions. The part of the groove 110 not having the limiting portion 120 is for receiving the substrate 210 of the light bar 200 and has a width W1 larger than or equal to a width of the substrate 210. The part of the groove 120 having the limiting portion 120 has a width W2 smaller than the width of the substrate 210 but larger than a width of the light source 220. Thus, the substrate 210 of the light bar 200 can be limited in the part of the groove 110 not having the limiting portion 120 and does not slide.

As indicated in FIG. 2B, the light guide plate 300 has a light incident surface 320 and a light emitting surface 310, and comprises an abutting portion 330. The light incident surface 320 of the edge-lit light emitting device is positioned on one lateral side of the light guide plate 300 and perpendicular to the light emitting surface 310. The abutting portion 330 is protruded outwards from the light incident surface 320 of the light guide plate 300. The abutting portion 330 and the light guide plate can be formed by the same material or different materials having high transparency. The side of the light guide plate 300 having the abutting portion 330 is inserted into the groove 110 via the opening 113, and a top end of the abutting portion 330 abuts to the light source 220 of the light bar 200. The emitting light of the light source 220 entering the light guide plate 300 via the abutting portion 330 and the light incident surface 320 is guided towards the light emitting surface 310. The light bar 200 tightly presses the light source 220 through the abutting portion 300 so that the light bar 200 can be firmly fixed in the first frame 101. In an embodiment, the abutting portion 330 is formed by SE 1185U silicone rubber of the Dow Corning Toray Co. Ltd. Furthermore, the abutting portion 330 and the light guide plate are integrally formed in one piece by way of double plastic injection. In other embodiments, the material and method for manufacturing the abutting portion can be adjusted according to actual needs, and the invention does not have specific restrictions regarding the material and manufacturing method.

Figure 3:
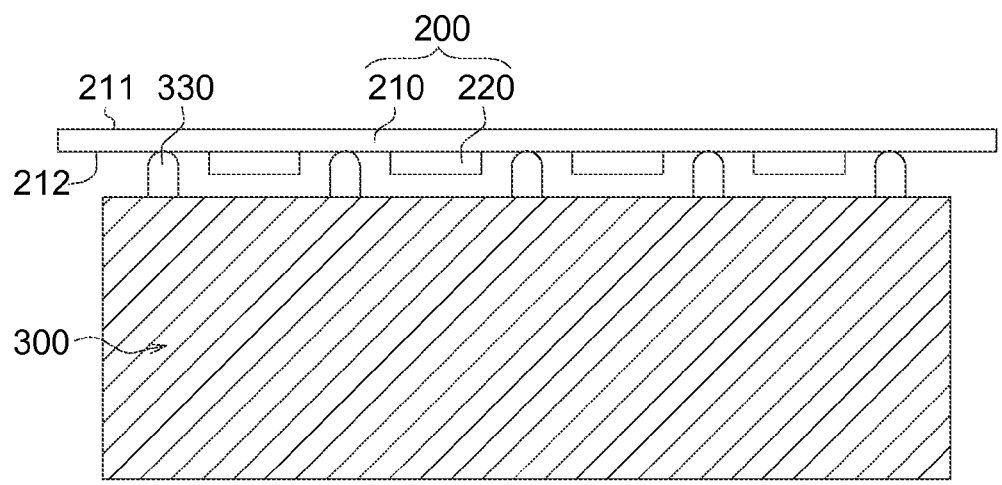
FIG. 3 is a top view of a light bar and a light guide plate according to an embodiment of the invention.

As indicated in FIG. 2B, the abutting portion 330 of the light guide plate 300 directly abuts to the light source 220 of the light bar 200. Since the abutting portion 330 has high transparency, the emitting light of the light source 220 can directly pass through the abutting portion 330 without incurring too much light loss. In other embodiments, the abutting portion 330 may directly contact the part of the upper surface 212 of the substrate 210 between the light sources 220 instead of abutting to the light source 220. Referring to FIG. 3, a top view of a light bar 200 and a light guide plate 300 according to an embodiment of the invention. In the present example, several abutting portions 330 are interlaced with several light sources 220, and the abutting portions 330 contact the part of the upper surface 212 of the substrate 210 not having the light source 220. That is, the abutting portions 330 of the light guide plate 300 of the invention can tightly press any part of the light bar to achieve fixing effect without having to be aligned with the light bar 200, hence saving assembly time. Besides, to avoid the light bar 200 or the abutting portions 330 being damaged when being pressed, the abutting portions 330 can be protruded from the light incident surface 320 in the shape of a cylinder and the top of the abutting portions 330 forms a conical dome. In other embodiments, the disposition of several abutting portions 330 can be replaced by a protruded strip of abutting portion 330.

Figure 4:
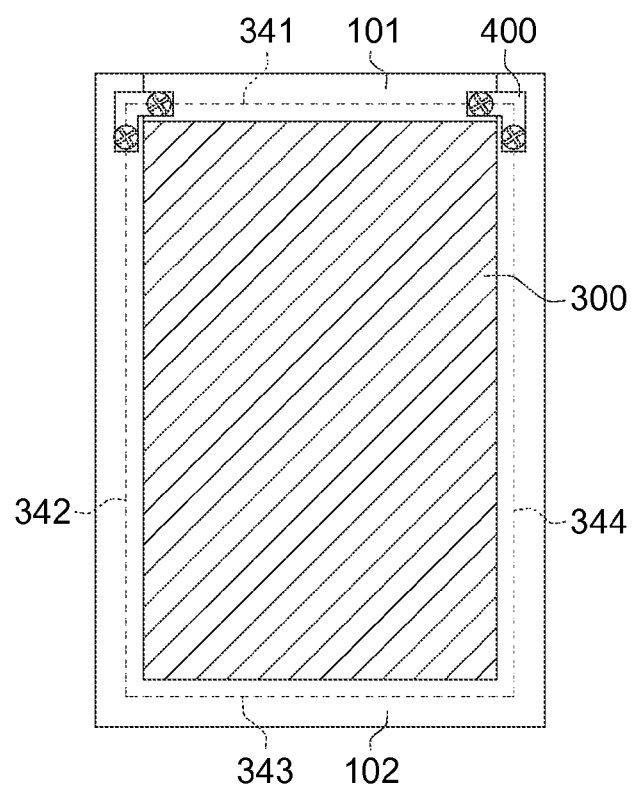
FIG. 4 is a top view of a light emitting device according to an embodiment of the invention.

Referring to FIG. 4, a top view of a light emitting device according to an embodiment of the invention is shown. To make the abutting portions 330 of the light guide plate 300 abut to the light bar 200 more firmly so that the light bar 200 can be firmly fixed on the first frame 101, a second frame 102 surrounding the light guide plate 300 is disposed. The light guide plate 300 of the present embodiment is exemplified by a rectangular light guide plate. The light guide plate 300 has a first side 341, a second side 342, a third side 343 and a fourth side 344, wherein the first side 341 is opposite to the third side 343, the second side 342 is opposite to the fourth side 344, and the light incident surface 320 and the abutting portions 330 are located on the first side 341. The first frame 101 clamps the first side 341 of the light guide plate 300 through the groove 110. The second frame 102 surrounds the other three sides of the light guide plate 300, namely, the second side 342, the third side 343 and the fourth side 344. The second frame 102, such as the U-shape frame of FIG. 4, can be integrally formed in one piece or formed by several sub-frames assembled together. The first frame 101 and the second frame 102 are assembled together by a pressing member 400 to form a closed bracket surrounding the four sides of the light guide plate 300. The pressing member 400 is such as a corner iron or a screw. Thus, the light guide plate 300 is restricted within the bracket formed by the first frame 101 and the second frame 102 so that the abutting portions 330 can continue to apply a force to fix the position of the light bar 200. It should be noted that the abutting portion 330 is only disposed on the first side 341 of the light guide plate 300 in the present embodiment, but can be disposed on other sides of other the light guide plate in other embodiments. For example, the abutting portions 330 can surround the peripheral of the light guide plate.

In practical application, the light emitting device of the invention can be used as a plane light source. For example, with the disposition of a lamp shade on the light emitting surface of the light emitting device, the light emitting device of the invention can be used as a flat light. With the disposition of a liquid crystal panel on the light emitting surface of the light emitting device, the light emitting device of the invention can be used as a backlight module for a flat panel display. The use of the light emitting device is not restricted in the invention.

Through the abutting portion disposed on the light guide plate, the light emitting device of the invention can tightly press the light bar so that the light bar and the frame can be fixed together without having to be aligned with each other or using any screws or adhesives, not only reducing manufacturing cost but also simplifying manufacturing process.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting device, comprising:
   a first frame whose inner side has a groove, wherein the groove is strip and has a bottom plane, two inner walls perpendicular to two sides of the bottom plane, and an opening;
   a light bar disposed in the groove, wherein the light bar comprises a substrate having a lower surface and an upper surface opposite to the lower surface, the lower surface is attached to the bottom plane of the groove, and the upper surface has a plurality of light sources; and
   a light guide plate having a light emitting surface and a light incident surface, wherein the light incident surface is positioned on one side of the light guide plate and perpendicular and adjoining to the light emitting surface, and the light guide plate has several protruded abutting portions, the side of the light guide plate having the light incident surface is inserted to the groove via the opening, the emitting light of the light source entering the light guide plate via the light incident surface first is guided by the light guide plate to be emitted off the light emitting surface, and the abutting portions of the light guide plate abut to the upper surface of the substrate or the light sources, so that the light bar is fixed in the groove and does not slide;

wherein the abutting portions and the light guide plate are integrally formed in one piece by different materials by way of double plastic injection.

2. The light emitting device according to claim 1, wherein the two inner walls adjoining to the opening are protruded towards interior of the groove to form a pair of limiting portions disposed oppositely, and a width between the limiting portions is smaller than a width of the substrate.

3. The light emitting device according to claim 2, wherein the abutting portions are cylindrical and the top of the abutting portions forms a conical dome.

4. The light emitting device according to claim 3, further comprising a thermal conductive adhesive disposed between the lower surface of the light bar and the bottom plane of the groove.

5. The light emitting device according to claim 4, the light guide plate comprises a first side and a third side opposite to the first side, and a second side and a fourth side opposite to the second side, both the first side and the third side are adjoining to the second side and the fourth side, and the light incident surface is positioned on the first side.

6. The light emitting device according to claim 5, further comprising a second frame surrounding the second, the third and the fourth sides of the light guide plate, and the second frame and the first frame are assembled together by way of screw locking to form a closed bracket, so that the abutting portions positioned on the light incident surface tightly abut to the upper surface of the light bar.

7. The light emitting device according to claim 6, wherein the second frame is integrally formed in one piece or by a plurality of sub-frames assembled together.

8. The light emitting device according to claim 1, wherein the abutting portions abut to the upper surface of the substrate between the light sources.

9. A flat light, comprising:
the light emitting device according to claim 1; and
a lamp shade disposed on the light emitting device and facing towards the light emitting surface.

10. A flat panel display, comprising:
the light emitting device according to claim 1; and
a liquid crystal panel disposed on the light emitting device and facing towards the light emitting surface.

* * * * *